J. BABILLION.
Grain Drier.
No. 37,800.
Patented March 3, 1863.
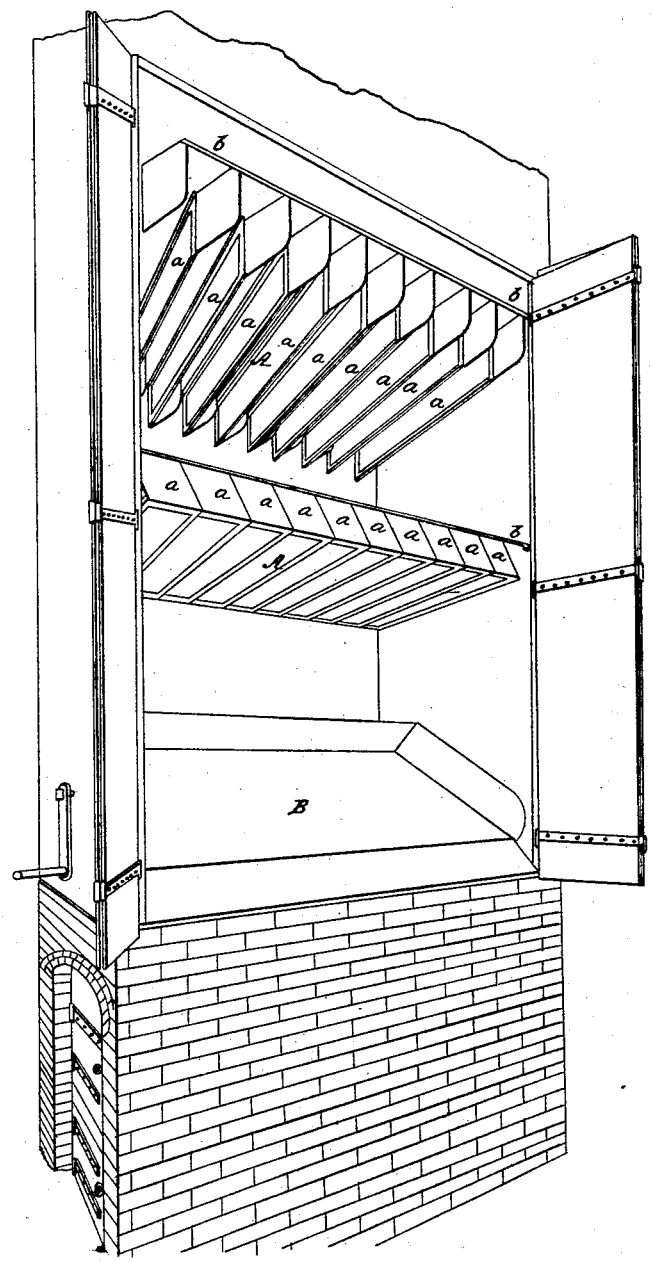

UNITED STATES PATENT OFFICE.

JOHN BABILLION, OF DETROIT, MICHIGAN.

IMPROVEMENT IN DRYING GRAIN.

Specification forming part of Letters Patent No. 37,800, dated March 3, 1863

*To all whom it may concern:*

Be it known that I, JOHN BABILLION, of Detroit, in the county of Wayne and State of Michigan, have invented a new and Improved Mode of Drying Grain or other Like Substances; and I do hereby declare that the following is a full and exact description thereof, reference being had to the accompanying drawing, and to the letters of reference marked thereon.

The nature of my invention consists in constructing a machine for drying grain, of two or more floors, A A, of any convenient size, arranged one above the other in any suitable form or size, each floor to be formed of narrow sections or trays *a a a* the whole width of the machine, and arranged to turn upon their centers simultaneously, and operated from the outside by means of a crank-movement, cords, and pulleys, or other convenient mechanical device, *b b*, the trays or sections to have the necessary sides to confine the grain, the bottoms to slightly overlap, to be formed of perforated sheet metal, wire-cloth, or other suitable material to admit of the passage upward through the perforations of the floor of heated air from the furnace below. The lowest floor or tray, B, immediately above the furnace, is not made of movable sections, as the others, but is constructed of one entire sheet of metal, and arranged to tilt, by means of a crank or otherwise, so as to discharge the dried grain through a slide at the side of the machine.

The mode of operating is as follows: The wet grain being placed by any means convenient on the uppermost floor, remains on the same until the greater part of the moisture has been evaporated. The sections which compose the floor are then tilted, when the grain falls onto the floor beneath, and are then again closed, to receive a fresh supply of grain. The operation is repeated upon each successive floor until the grain is dried. The lower floor is arranged to deliver the dried grain to the outside of the machine, the mode of heating to be by any form of furnace now in use.

What I claim as my invention, and desire to secure by Letters Patent, is—

In machines for drying grain, the employment of several drying-floors arranged one above the other, and so constructed that the sections composing the floors can be dumped, and the grain fall upon the floor below, thereby admitting the grain, in process of drying, to a series of relays, and when dried of ready transmission from the machine by tilting the floor B, substantially as described.

JOHN BABILLION.

Witnesses:
   F. E. PHELPS,
   E. H. BOSS.